Dec. 7, 1926.
W. J. HEFLIN
SHOCK ABSORBER
Filed August 22, 1925
1,609,353
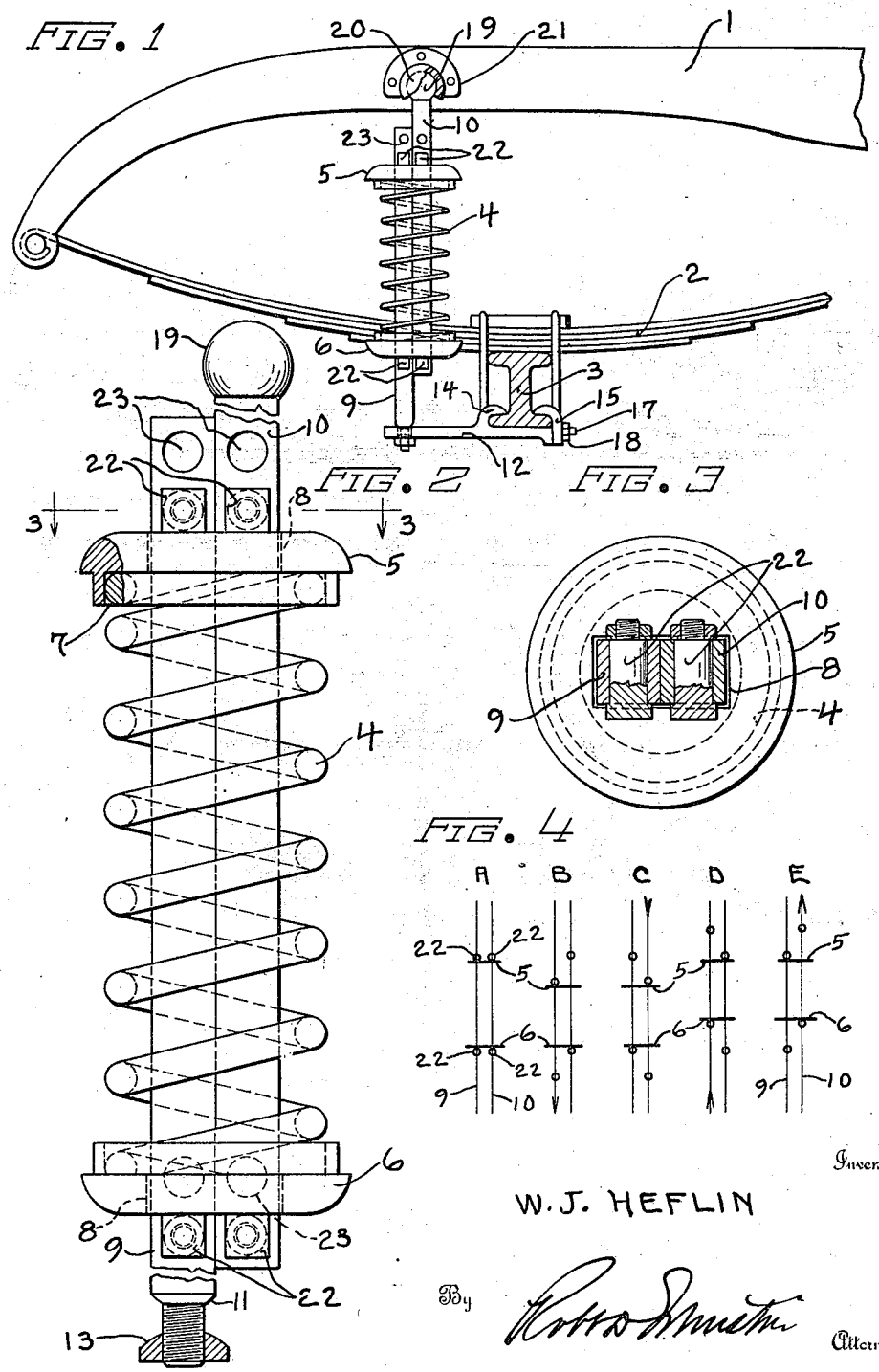
Inventor
W. J. HEFLIN
By Rotto Smith
Attorney Patented Dec. 7, 1926.

1,609,353

UNITED STATES PATENT OFFICE.

WYATT J. HEFLIN, OF ORLANDO, FLORIDA.

SHOCK ABSORBER.

Application filed August 22, 1925. Serial No. 51,814.

My invention relates to certain new and useful improvements in spring shock absorbers which is characterized by the utilization of a spring assembly, comprising relatively movable actuators for opposed spring seats which are free of fixed connection to either seat and each of which has equi-distantly spaced stops between which the springs seats are interposed. The advantages of such an arrangement lies in the fact that movement of either actuator relative to the other in either direction is resisted by the spring. Thus the spring will resist body movements downward as well as rebounds. Moreover, this construction has the additional advantage of permitting the spring to be brought under any desired initial tension, which can be set according to the dead load on the car in connection with which the device is employed.

My invention further comprises the novel details of construction and arrangements of parts, which in their simplest embodiment are illustrated in the accompanying drawings, which form a part of this specification, and in which:—

Fig. 1 is a side elevation of a part of an automobile equipped with my improved type of spring shock absorber.

Fig. 2 is an enlarged detail view of the shock absorber detached.

Fig. 3 is a sectional view on the line 3—3 of Fig. 2.

Fig. 4 is a diagrammatic view illustrating the manner in which the spring resists relative movement between its actuators so as to oppose displacement of the vehicle body relative to its running gear and vice versa.

Similar reference numerals refer to similar parts throughout the drawings.

In the embodiment of my invention illustrated, I show my invention associated with the chassis 1 of an automobile having a typical leaf spring 2 suitably connected to its axle 3. All of the parts thus described are merely conventionally illustrated parts of a vehicle body and running gear with which my shock absorber may be associated.

The shock absorber proper, which is illustrated more fully in Figs. 2 and 3, comprises a spring 4, preferably a coiled spring, having opposed seats 5 and 6. Where the coiled spring is used its ends are received in circumferential grooves 7 in spring seats, which grooves are shaped to snugly receive the spring ends and are made deep enough to securely hold the seats in position on the spring ends.

The spring seats are provided with aligning guide apertures 8 which are preferably square with their centers concentric with the axis of the spring. Two spring actuators 9 and 10 are inserted longitudinally through the spring and through the seat apertures 8, the actuator 9 having at its lower end a rounded shoulder 11 beyond which projects a threaded shank adapted to be passed through a suitable hole in a clamp bracket 12 and to receive a nut 13 having a rounded or ball top which will bear against the under face of the bracket. This represents a simple joint which will permit the spring actuator to rock angularly after the fashion of a ball joint. The clamp bracket, as illustrated, is adapted for attachment to the front axle and has an overhanging lug 14 engaging one side flange of the axle while a clip 15 on a threaded shank 17 on the bracket is clamped against the other flange of the axle by a nut 18. This bracket arrangement is conventional, and may be varied according to the part of the running gear to which it is desired to attach the lower spring actuator, but it should be such as to impart an up or down thrust on the actuator 9 and to permit it to rock and follow lateral movements of body and running gear. The upper spring actuator 10 has a ball head 19 received in any suitable ball joint 20, the upper portion of which is integral with a bracket 21 adapted to be bolted or riveted to the body frame. Such a mounting is typical of any connection between the body and the upper spring actuator which will permit the latter to follow the lateral play of the body on its springs and to move up and down with it.

The two actuators are provided each with a pair of equally spaced apertures adapted to receive bolts 22. The two bolts on each actuator receive between them the two spring seats and thus when the shock absorber is at rest each spring seat bears against the square nut or bolt heads of two bolts, one on each actuator, thus holding the actuators in what I term initial position. Obviously, the space between the bolts on the actuators determines the initial tension on the spring and by using two or more bolt holes 23 at each end of each actuator, the bolts can be set closer or further apart and the initial tension on the spring can thus be regulated.

In operation, bearing in mind that the seats for the spring are free of positive connection to either actuator and that the seats are interposed between the bolts on both actuators, it follows that, whenever relative movement axially of the spring in either direction takes place between the actuators, it will be resisted by the spring which thus acts not only to resist downward movements of the body relative to the running gear, but the rebound of the body, and in like manner it resists the up thrust of the running gear and the down kick of the running gear responsive to the action of the main springs. In other words, a single spring, whatever its shape, can be made to resist every displacement of the body or running gear from normal position which it is desired to resist and it does it with an initial tension upon the spring which can be regulated to suit its action to any particular work.

In Fig. 4, the diagrams show how vertical movements of either actuator relative to the other will compress the spring. In this view their positions are illustrated and respectively lettered A, B, C, D and E. The position A shows the normal operating position with the spring under predetermined initial tension; position B shows the spring compressed by a down movement of the running gear relative to the body; position C shows the same compression affected by a down movement of the body relative to the running gear; position D shows the spring compressed by an upward movement of the running gear relative to the body; and position E shows the spring similarly compressed by an upward movement of the body relative to the running gear.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A shock absorber comprising, in combination, a coil spring, disks forming spring centering seats and each having a central aperture, a pair of juxtaposed spring actuators which project axially through the spring and through the aperture in each spring seat, a pair of rigidly mounted relatively adjustable stops on each actuator which receive between them the spring seats, means to connect one actuator to the body free for angular play, and means to connect the other actuator to the running gear free for annular play.

2. A shock absorber according to claim 1, in which the stops are formed by bolts engaged in holes of a series in each actuator, each bolt having flat head and nut faces which engage the adjacent spring seat.

In testimony whereof I affix my signature.

WYATT J. HEFLIN.